UNITED STATES PATENT OFFICE.

LEOPOLD NATHAN, OF ZURICH, SWITZERLAND.

MANUFACTURE OF BEVERAGES.

No. 863,085.

Specification of Letters Patent.

Patented Aug. 13, 1907.

Application filed August 2, 1902. Serial No. 118,185.

*To all whom it may concern:*

Be it known that I, LEOPOLD NATHAN, a subject of the Emperor of Germany, and a resident of Zurich, Switzerland, have invented certain new and useful Improvements in the Manufacture of Beverages, of which the following is the specification.

My present invention relates to the manufacture of non-alcoholic beverages from fruit such as, for instance, dried apples, by treating them in the particular manner hereinafter described and claimed.

The object of my invention is to produce a perfectly limpid beverage which is absolutely sterile and free from the disagreeable taste liable to be caused by the drying of the fruit.

In carrying out my invention I proceed as follows: The fruit is leached with water and the resulting juice or liquid is filtered, the filtration being preferably effected during a downward flow of the liquid. I prefer to carry out such leaching and filtration in a series of successive stages, using the filtered liquid which comes from the first leaching operation to treat another mass or body of fruit in the second stage of the operation, so that the partly saturated liquid comes in contact with fresh fruit. The liquid is thus gradually enriched and becomes more and more efficient for leaching fruit. It will of course be understood that the apparatus employed should be made of suitable material so as not to impart any unpleasant taste to the product.

The leaching and filtration having been completed, the juice is heated to a temperature of about sixty to seventy degrees centigrade and is at the same time stirred and aerated by means of sterilized air. This air may be introduced either by pressure or by suction and will contribute to the formation of a number of volatile oils or essences according to the temperature. Disagreeable bouquets or flavors are carried away to a large extent at the same time. It will be understood that the air is caused to pass through the liquid.

Another function of this treatment with air is to precipitate the albumen bodies and thereby prevent turbidity of the bottled juice or beverage. Care should be taken to keep the liquid in motion and to prevent any particle from being heated above sixty to seventy degrees centigrade. Should the temperature rise above seventy degrees, the fructose or glucose undergoes a material change in taste and digestibility. The aeration having been completed, the air is removed from the liquid by placing it under a vacuum. The liquid is then cooled while the stirring is continued. Stirring the liquid materially assists the process, as it not only enables better heating and cooling effects to be obtained, but makes the liquid more accessible to the air, and by breaking the liquid up into small particles, allows the objectionable bodies to be more readily separated and driven off. During the cooling operation, carbonic acid is admitted, and this acid is eagerly absorbed by the liquid, since the latter is free from air. I prefer to admit only so much carbonic acid as will be absorbed without pressure. Absorption having been completed, a current of carbonic acid is passed through the liquid for the purpose of eliminating entirely oils and essences of disagreeable taste and smell which could not be entirely removed by the passage of air hereinbefore described. The liquid is then again filtered, is then cooled and saturated with carbonic acid under pressure. This leaves the beverage ready for bottling, which is preferably done by means of an isobarometric filling apparatus; the liquid in the bottles is sterilized at a temperature not exceeding seventy degrees centigrade, and this I prefer to effect by shaking the bottles in the sterilizing chambers.

I claim as my invention:

1. The herein described process of manufacturing fruit beverages, which consists in extracting a fruit juice, heating and simultaneously aerating it, removing the air by exhaust, thereupon cooling the juice and during such cooling operation first introducing carbonic acid to be absorbed by the liquor and then passing a current of carbonic acid therethrough, filtering and cooling the liquor, and causing it to absorb carbonic acid under pressure.

2. The herein described process of manufacturing fruit beverages, which consists in extracting a fruit juice, heating and simultaneously aerating it, thereupon removing the air by exhaust, then cooling and simultaneously treating the juice with carbonic acid gas at atmospheric pressure, then passing a current of carbonic acid gas through the liquor, then filtering and cooling the liquor and saturating it with carbonic acid under pressure, and finally bottling and sterilizing the liquor.

In testimony whereof, I have signed my name to this specification, in the presence of two subscribing witnesses.

LEOPOLD NATHAN.

Witnesses:
ADAM LIEBERKNECHT,
MARIE STEINMANN.